A. E. WESTBURG.
GAS CUT-OFF.
APPLICATION FILED JUNE 8, 1908.
921,191.
Patented May 11, 1909.
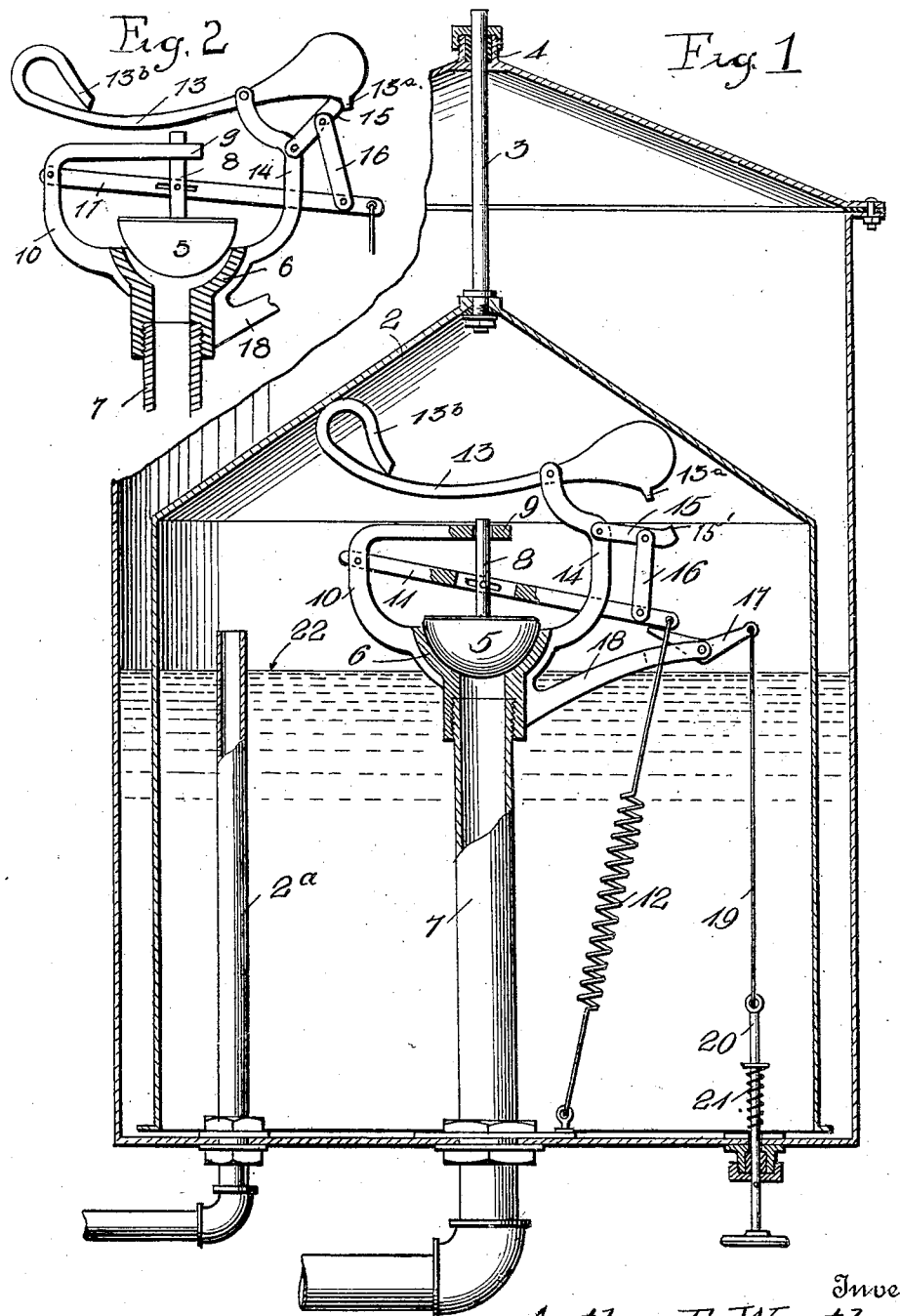

UNITED STATES PATENT OFFICE.

ARTHUR E. WESTBURG, OF JAMESTOWN, NEW YORK.

GAS CUT-OFF.

No. 921,191.      Specification of Letters Patent.      Patented May 11, 1909.

Application filed June 8, 1908. Serial No. 437,453.

*To all whom it may concern:*

Be it known that I, ARTHUR E. WESTBURG, a citizen of the United States, residing at Jamestown, in the county of Chautauqua and State of New York, have invented certain new and useful Improvements in Gas Cut-Offs; and I do declare the following to be a full, clear, and exact description of the invention, such as will enable others skilled in the art to which it appertains to make and use the same.

My invention relates to improvements in what may be termed gas safety appliances.

It is designed more especially for use in houses or buildings supplied with natural or manufactured gas and to provide for automatically shutting off the supply or inflow of gas to a tank located therein at a suitable point as in the cellar or other place for preventing the delivery of the gas to the burner pipes of the house, in event of a leakage or break in the pipe or main leading from the source of supply as at the gas plant or at the natural gas wells, until such defect or leakage may be remedied.

It has for its further object to carry out these ends in a simple, effective and reliable manner.

With these and other objects in view, the invention consists of certain novel features of construction, combination and arrangement of parts, as will be more fully described and particularly pointed out in the appended claims.

In the accompanying drawings illustrating the preferred embodiment of my invention, Figure 1 represents a sectional elevation thereof, with the valve in closed position; and Fig. 2 is a detail showing the valve open.

In the embodiment of the invention, illustrated, a gastight tank or outer receptacle 1 is located at any desired point with a bell or lower open ended receptacle or tank 2 arranged within the tank 1 and having a guiding stem 3 extending through the dome or apex of said tank 1 with a suitable packing arranged around it within a tubular upward extension 4 of the tank 1. This extension 4 has a bushing therein, preferably of aluminum to prevent the possible sticking or adherence of the packing thereto, as might otherwise occur from long contact, since an emergency or leak may not arise until after the lapse of a long period of time, if ever. A gas delivery pipe $2^a$ is fixed in the bottom of the tank 1, with its upper end extending a short distance above the level of the fluid seal for said bell, hereinafter referred to.

An inlet valve 5 is arranged in a suitable seat 6, provided upon the upper end of the inlet pipe 7 of the tank 1, said valve having its stem 8 suitably guided in an arm 9 of a bracket 10 secured to the upper end of the inlet pipe 7. A lever 11 has one end pivoted to the bracket 10 and is connected intermediately of its ends with the valve stem 8 and has its opposite end connected to a spring 12 suitably secured to a fixed point, preferably at the bottom of the tank 1, the tension of said spring being designed to force the free end of the lever 11 down and seat and hold the valve 5 gastight on its seat 6.

A trip lever 13 is suitably pivoted upon an arm or bracket 14 secured in common with the bracket 10 to the upper end of the pipe 7, said trip lever being arranged transversely within the bell 2 for engagement by the latter when in its lowermost position, the purpose of which will presently be seen. A bar or lever 15 is pivoted at one end to the bracket 14 with its free end provided with a nose 15' to be engaged by a hook 13' on one end of the trip lever 13, and is pivotally connected by a link 16 with the free end of the lever 11.

A lever 17 preferably in the form of a slightly obtuse-angled member, is centrally pivoted to an arm 18 of the bracket carried by the inlet pipe 7. One end of said lever is arranged to bear against the lower face of the spring connected end of the lever 11 and the opposite end of said lever is connected to one end of a wire or line 19, which is connected to a stem or rod 20. This rod 20 is passed through and packed at the bottom of the tank, preferably as shown to render the same fluid tight and is adapted to be manually actuated. Upon said rod 20 is arranged a push spring 21 the tension or pressure of which is delivered thereon to normally hold the lever 17 out of engagement with the lever 11, when the latter is arranged to hold the valve 5 in elevated position relative to its seat 6.

A suitable sealing liquid 22, as crude oil or any other like substance, which will not freeze or explode is placed in the tank 1 for the submergence of the open end of the bell 2 for forming a liquid or fluid tight packing or seal for said bell.

Normally, the valve 5 is held in elevated or open position by the engagement of the nose 13ª of the lever 13 with the hooked end of the bar 15 which holds the free end of the lever 11 up against the tension of the spring 12. Should leakage take place in the supply or service pipe, pressure under the bell 2 will be reduced and cause said bell to descend and engage the end 13ᵇ of the trip 13 and accordingly raise the end 13ª of said trip disengaging it from the member 15, thereby allowing the valve 5 to be forced to its seat by the spring 12, and cutting off the supply of gas to the tank or bell, until the leakage shall be remedied. When it is desired to open the valve 5, a pull is exerted on the rod 20 against the tension of the spring 21 which causes the free end of the lever 17 to move upwardly and force the lever 11 up until the hooked end of the bar 15 engages with the nose 13ª of lever 13 whereby the valve is opened and locked in open position.

It will be observed that from the foregoing arrangement of parts an efficient and simple contrivance is provided for preventing the waste of gas in case of leakage, and that the contrivance is simple in construction, inexpensive of manufacture and reliable and automatic in action, while it may be readily adjusted for action.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent is:—

1. A device of the character described, comprising a tank having a bell operable therein a valve, a supply pipe opening under said bell and having a seat in its upper end for said valve, a spring pressed lever for forcibly engaging said valve, a spring held member operable to engage said lever and force it in elevated position, means for locking said lever in elevated position, and means for releasing said lever operable by the descent of the bell.

2. A device of the character described, comprising a tank having a supply pipe, a bell arranged within said tank, a valve seated in the upper end of the supply pipe, a lever connected with the stem of said valve, an arm connected with said lever, a trip normally engaged with said arm to hold the valve in open position and operable to release said arm on the descent of said bell and means connected with said lever for closing the valve on the release of said arm.

3. A device of the character described, comprising a tank, a bell arranged in said tank, a supply pipe, a valve seated in the delivery end of said supply pipe, an operating lever connected with said valve, an arm linked to said lever, a pull spring connected with the free end of said lever, a setting lever for engagement with the lower face of said operating lever, means for holding said setting lever out of engagement with the operating lever, and a trip adapted to engage said arm said bell being adapted in its downward movement for engagement with said trip to release said arm.

4. A device of the character described, comprising a tank, a bell arranged within said tank, a supply pipe, a valve arranged in the delivery end of said supply pipe, an operating lever having the stem of said valve connected therewith, a pivoted arm having link connection with said operating lever, a trip having engagement with said arm, a spring for the retention of said operating lever under pressure, a setting lever adapted for engagement with said operating lever, means for actuating said setting lever, a spring arranged upon said setting lever, actuating means for the retention of said lever under pressure, said bell being adapted to engage said trip in its downward movement.

In testimony whereof I have hereunto set my hand in presence of two subscribing witnesses.

ARTHUR E. WESTBURG.

Witnesses:
JACOB O. RELLER,
JOHN E. WHEELER.